(12) United States Patent
Lazar (10) Patent No.: US 7,843,345 B2
(45) Date of Patent: Nov. 30, 2010

(54) DUAL FREQUENCY RFID CIRCUIT

(75) Inventor: Steve Charles Lazar, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 860 days.

(21) Appl. No.: 11/714,337

(22) Filed: Mar. 5, 2007

(65) Prior Publication Data

US 2008/0218344 A1     Sep. 11, 2008

(51) Int. Cl.
*G08B 13/14* (2006.01)
(52) U.S. Cl. ............... 340/572.5; 340/572.1; 340/10.1; 340/10.3; 235/492
(58) Field of Classification Search ............. 340/572.1, 340/572.5, 572.8, 539.1, 825.69, 825.72, 340/505, 10.1, 10.3; 342/42, 51; 235/380, 235/381, 383, 385, 492; 343/741, 742, 745, 343/749
See application file for complete search history.

(56) References Cited

U.S. PATENT DOCUMENTS

| | | | | |
|---|---|---|---|---|
| 4,160,971 | A * | 7/1979 | Jones et al. | 340/870.26 |
| 5,680,106 | A * | 10/1997 | Schrott et al. | 340/10.33 |
| 5,712,630 | A * | 1/1998 | Nanboku et al. | 340/10.3 |
| 6,445,271 | B1 * | 9/2002 | Johnson | 336/200 |
| 2001/0011948 | A1 * | 8/2001 | Rasband | 340/572.5 |
| 2004/0104809 | A1 * | 6/2004 | Rizzo et al. | 340/10.34 |

* cited by examiner

*Primary Examiner*—Hung T. Nguyen
(74) *Attorney, Agent, or Firm*—William B. Kempler; Wade J. Brady, III; Frederick J. Telecky, Jr.

(57) ABSTRACT

A radio frequency identification (RFID) transponder (FIGS. 4 and 5A) is disclosed. The transponder includes first (RF) and second (GND) terminals. A first resonant circuit (500, 504, 508) is connected between the first and second terminals. A second resonant circuit (502, 504, 508) has a second resonant frequency different from the first resonant frequency and is connected between the first and second terminals.

17 Claims, 12 Drawing Sheets

DUAL FREQUENCY RFID CIRCUIT

BACKGROUND OF THE INVENTION

The present embodiments relate to radio frequency identification (RFID) circuitry and, more particularly, to a dual frequency RFID circuit.

Radio frequency identification (RFID) circuits or transponders are prevalent in business, personal, and other applications, and as a result the technology for such devices continues to advance in various areas. Numerous applications for RFID circuits include automatic vehicle identification (AVI) for toll booth systems, smart card systems, book identification for libraries, pet identification systems, and inventory control. All of these systems include an interrogator and a single frequency RFID transponder. The interrogator must activate the transponder within a certain range, interrogate the transponder for specific information, and acknowledge receipt of the information. There are several advantages of the RFID circuit. First, it does not require an optical link. Thus, it can be implanted for pet identification or in a person to provide medical information. Second, it is typically powered by a received continuous wave (CW) signal from the interrogator and is, therefore, virtually maintenance free. Finally, the RFID transponder preferably communicates with the interrogator by backscattering. The transponder operates in resonance with the interrogator, modulates the original CW transmission, and sends it back to the interrogator. Thus, the RFID transponder emits no radio frequency signals until it is within range of a corresponding interrogator.

Figure 2:
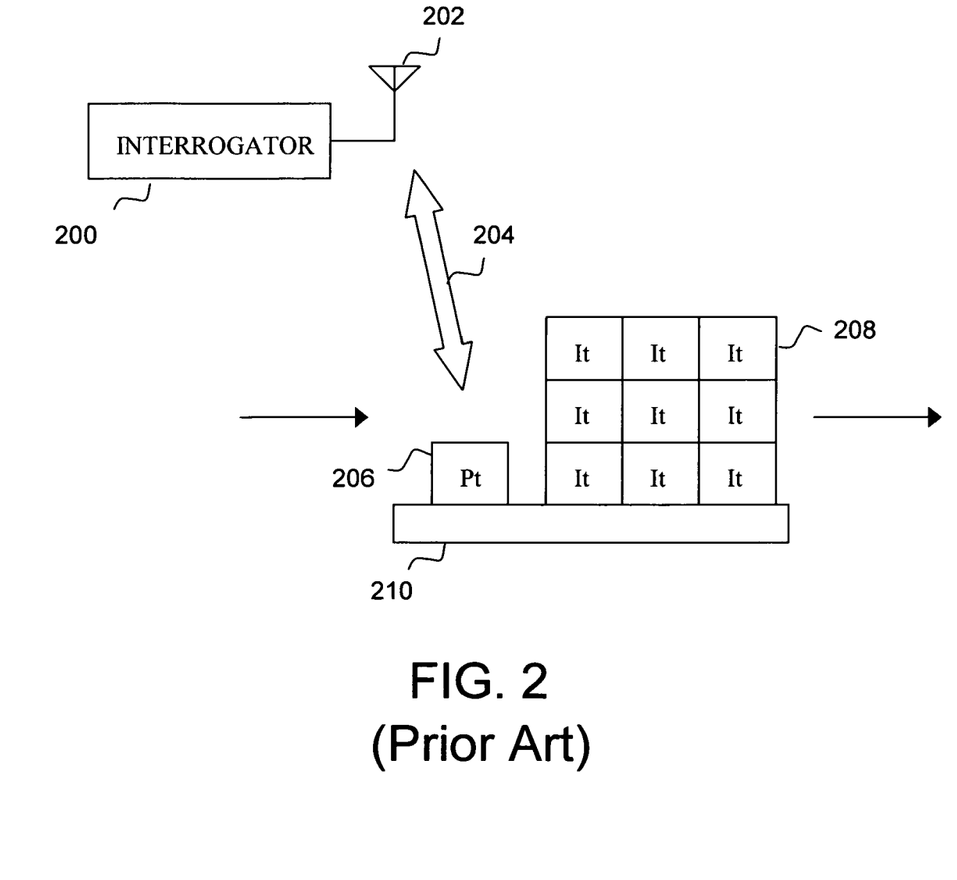
FIG. 2 is a simplified diagram of a single frequency RFID system of the prior art.

Referring to FIG. 2, there is an exemplary single frequency RFID system of the prior art which may be used for inventory control in a retail store. A detailed specification of such an RFID system is described at "EPC™ Radio-Frequency Identity Protocols, Class-1 Generation-2 UHF RFID," Version 1.0.9, January 2005, and incorporated herein by reference in its entirety. Interrogator 200 and antenna 202 originate a single frequency CW signal to activate a pallet transponder (Pt) 206 when the pallet 210 passes through a loading dock within range of the interrogator. Separate item transponders (It) 208 are required for each item 208 on the pallet 210. These separate item transponders 208 respond to different CW frequencies from the pallet transponder 206. They are preferably activated by different interrogators at point of sale terminals. Interrogator 200 and the point or sale terminal interrogators are coupled to a central computer which collects information for each item entering or leaving the store.

While the preceding approach is a significant improvement over previous inventory control methods, the present inventor recognizes that still further improvements may be made by addressing some of the drawbacks of the prior art. In particular, there is a need to improve communication with various interrogators over different frequencies with a single RFID transponder. Furthermore, such a multiple frequency transponder must remain simple and relatively inexpensive in order to be compatible with a wide range of applications. Accordingly, the preferred embodiments described below are directed toward these benefits as well as improving upon the prior art.

SUMMARY OF THE INVENTION

In a preferred embodiment of the present invention, a radio frequency identification transponder includes first and second terminals. A first resonant circuit having a first resonant frequency is connected between the first and second terminals. A second resonant circuit having a second resonant frequency different from the first resonant frequency is connected between the first and second terminals.

DETAILED DESCRIPTION OF THE INVENTION

Figure 3:
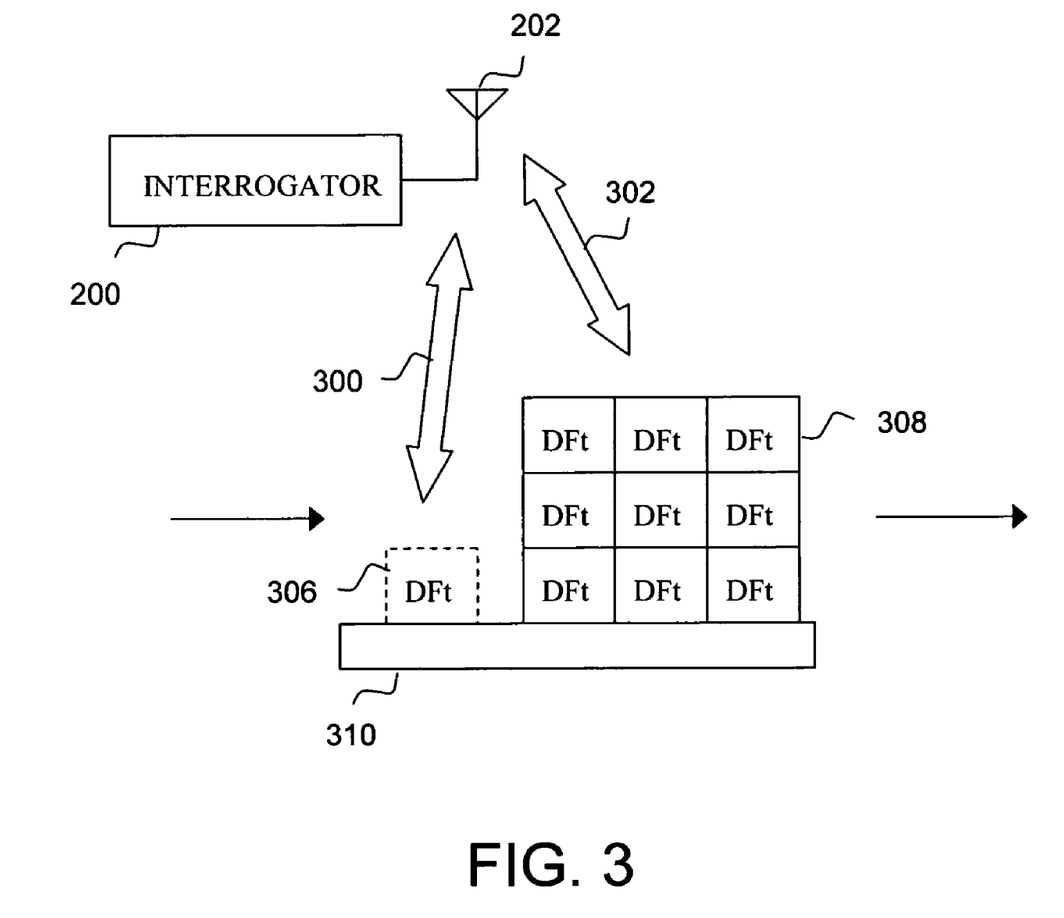
FIG. 3 is a simplified diagram of a dual frequency RFID system of the present invention.

The preferred embodiments of the present invention provide significant advantages over single frequency radio frequency identification (RFID) transponders of the prior art. Referring to FIG. 3, there is an exemplary dual frequency RFID system of the present invention which may be used for inventory control in a retail store. Interrogator 200 and antenna 202 originate a single frequency continuous wave (CW) signal to activate a dual frequency transponder pallet transponder (DFt) 306 when the pallet 310 passes through a loading dock within range of the interrogator. The CW signal from interrogator 200 is preferably ultra high frequency (UHF) in the 860-960 MHz band. Other dual frequency item transponders (DFt) 308 may be included for each item on the pallet 310. In operation, both RFID transponders 306, 308 are responsive to high frequency (HF) CW signals at 13.56 MHz as well as UHF CW signals in the 860-960 MHz band. Interrogator 200, however, may mute RFID transponders 308 and only interrogate RFID transponder 306. RFID transponder 306 responsively identifies the contents of the pallet. Subsequently, RFID transponders 308 may be activated by interrogator 200 as well as by different interrogators at point of sale terminals. Interrogator 200 and the point or sale terminal interrogators are coupled to a central computer which collects information for each item entering or leaving the store.

Figure 1A:
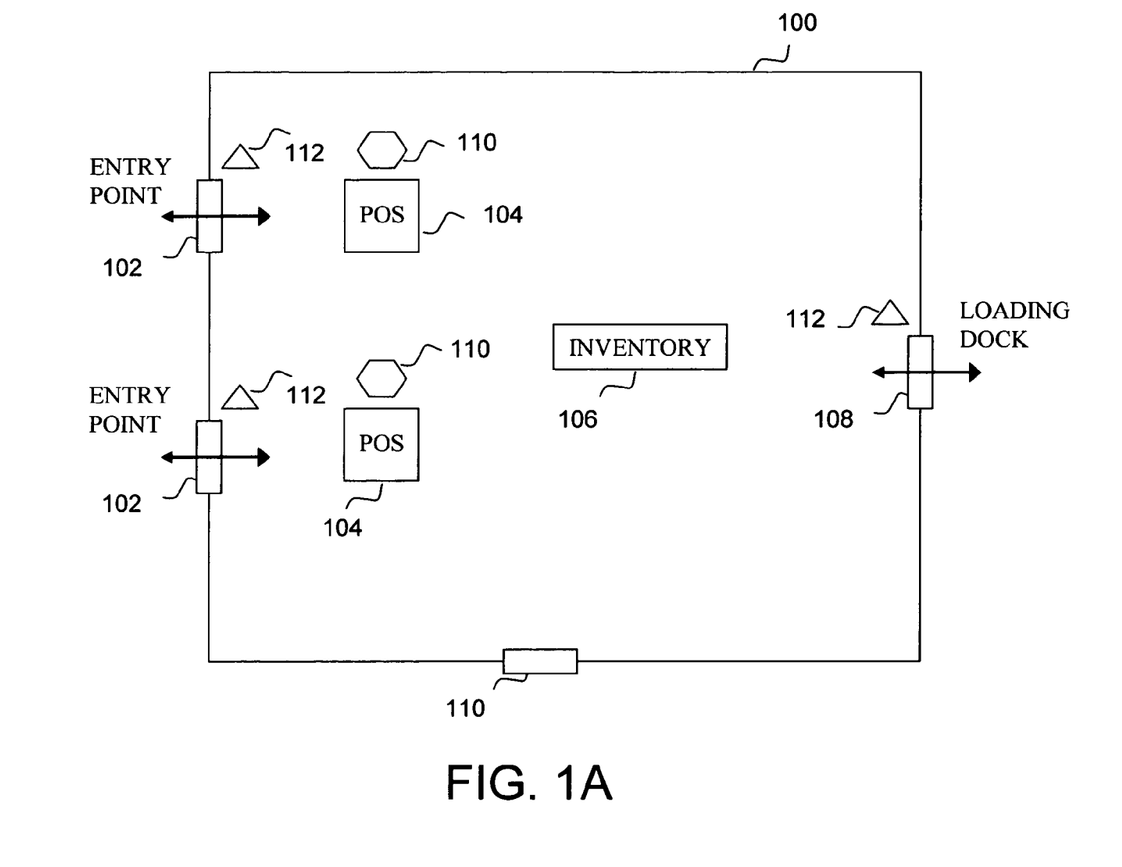
FIG. 1A is a simplified diagram of a store with inventory control of the present invention.

Referring to FIG. 1A, there is a simplified diagram of a store with inventory control of the present invention. In operation, pallet 310 (FIG. 3) initially enters the store through loading dock 108. When the pallet 310 is within range of UHF interrogator 112, both pallet transponders 306 and item transponders 308 respond in unison. UHF interrogator 112 then mutes all transponders and steps through each transponder using binary singularization. The binary singularization process typically identifies 1700 transponders per second. This process identifies the pallet transponder 306 as well as each individual item transponder 308 on pallet 310 by electronic product code as well as unique information such the date and time of initial transponder programming or individual random number. This information is transmitted to the central computer. Individual items are then removed from palled 310 and placed in inventory 106. As items are sold from inventory 106, they pass within range of HF interrogators 110 in close proximity to respective point of sale terminals 104. Interrogators 110 identify each item and send a price to point of sale terminal 104. Interrogators 110 also notify the central computer of each individual item sale. Upon completion of the sale, each item then passes through an entry point 102 where it passes within range of a corresponding UHF interrogator 112. UHF interrogator 112 assures that each item that leaves the store has passed through a point of sale terminal 104 and notifies the central computer.

The UHF signal has greater range than the HF signal and, therefore, is more efficient at entry points 102 and loading docks 108. Alternatively, the HF signal has a shorter range. This is desirable at point of sale terminals 104 operating in close proximity to avoid interference. The present invention advantageously permits one dual frequency transponder (306, 308) to respond to both UHF and HF CW frequencies from either interrogator. Moreover, the dual frequency transponder provides information about the pallet as well as individual items on the pallet. Furthermore, since the dual frequency transponder responds to HF CW signals at the point of sale terminals, only a single transponder is required to track each item within range of either UHF or HF interrogators.

Figure 1B:
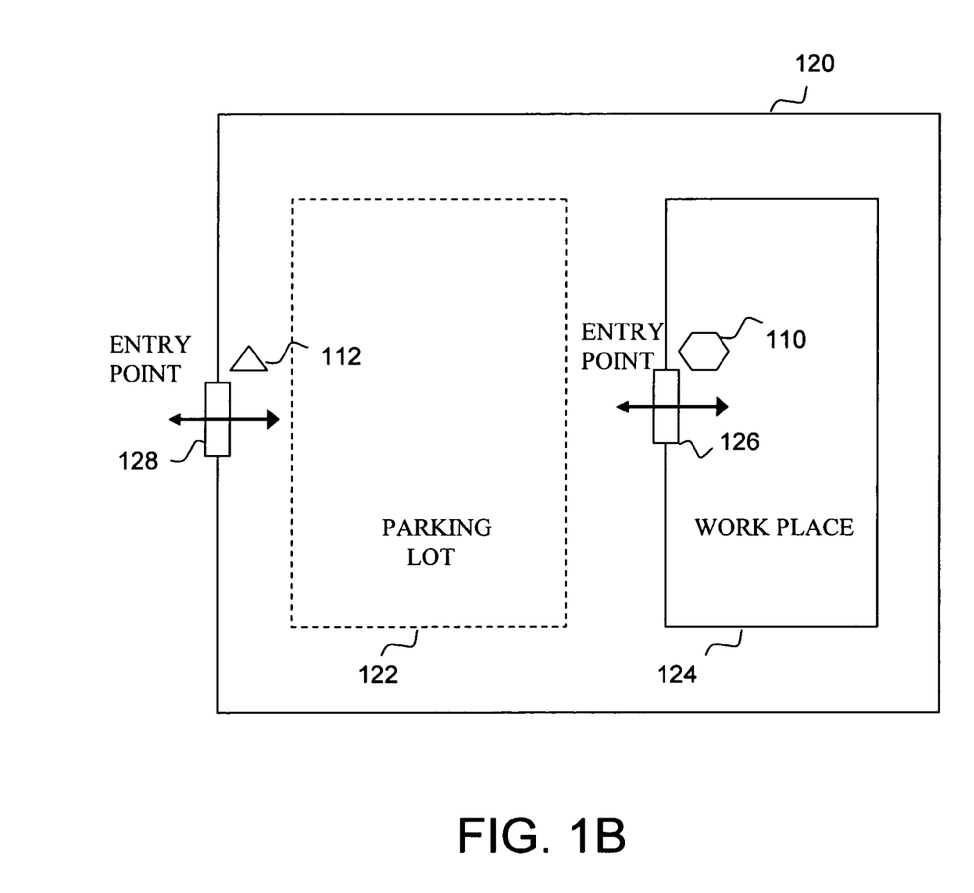
FIG. 1B is a simplified diagram of a workplace with a security system of the present invention.

Referring to FIG. 1B, there is a simplified diagram of a work site with a security system illustrating another embodiment of the present invention. The work site is surrounded by a security fence 120 with an entry and exit gate 128. For this embodiment, employees have a dual frequency RFID transponder in their identification badges. When an employee enters the work site through gate 128, UHF interrogator 112 relays the entry to a central computer. The employee then parks in lot 122 and walks to the entrance 126 of work place 124. Upon entry of work place 124 the employee badge passes within range of HF interrogator 110. HF interrogator 110 then records the entry and relays it to the central computer. In this manner, entry into each work site is precisely monitored.

As in the example of FIG. 1B, the UHF signal has greater range than the HF signal and, therefore, is more efficient at the parking lot entry point 128. Alternatively, the HF signal has a shorter range. This is desirable at work place entry point 126 to avoid interference when several employees enter at the same time. The HF interrogator 110, therefore, is preferably a close proximity badge reader. The present invention advantageously permits one dual frequency RFID transponder in each employee badge to respond to both UHF and HF CW frequencies from either interrogator 112 or 110, respectively. Only a single RFID transponder is required to track each entry and exit of each employee within range of either UHF or HF interrogators.

Figure 1C:
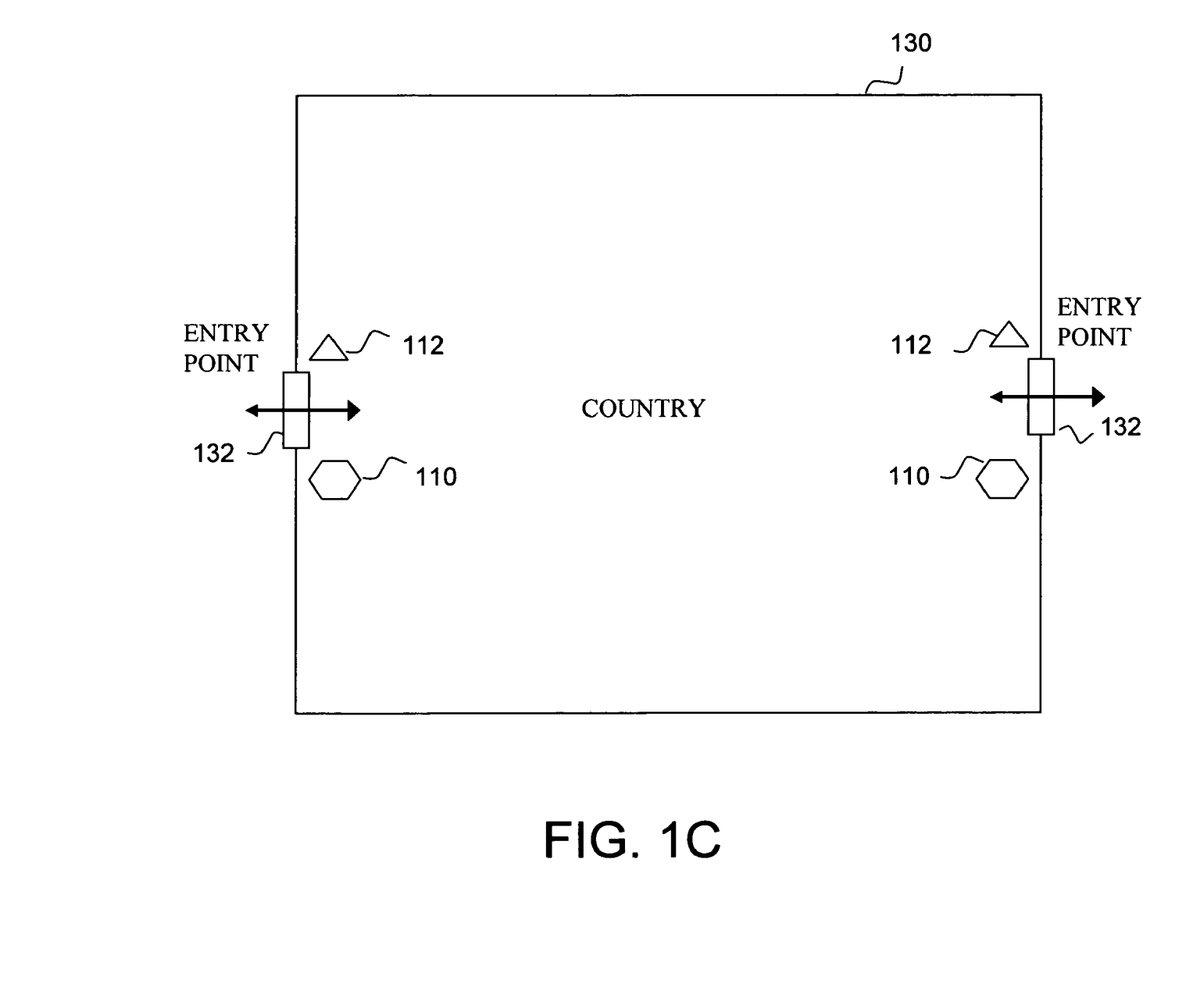
FIG. 1C is a simplified diagram of a country with a security system of the present invention.

The present invention may be extended to home land security applications. FIG. 1C is a simplified diagram of a country with a security system of the present invention. The country is bounded by perimeter 130 having entry points 132. According to a preferred embodiment of the present invention, documented aliens are preferably issued an identification badge having a dual frequency RFID transponder of the present invention. Operation of the transponder with respect to UHF 112 and HF 110 interrogators is similar to the previously described embodiment of FIG. 1B. UHF interrogator 112 identifies each RFID transponder within a vehicle that enters or leaves entry points 132. Likewise, HF transponder 110 identifies each RFID transponder of each documented alien who enters by foot. Other HF interrogators may be located throughout the country within perimeter 130 to monitor the documented alien at retail, banking, employment, and law enforcement sites. Each interrogation is relayed to a central computer to maintain a current location and status of the documented alien. In this manner, the location and history of each documented alien as well as the duration of their stay is recorded.

Figure 4:
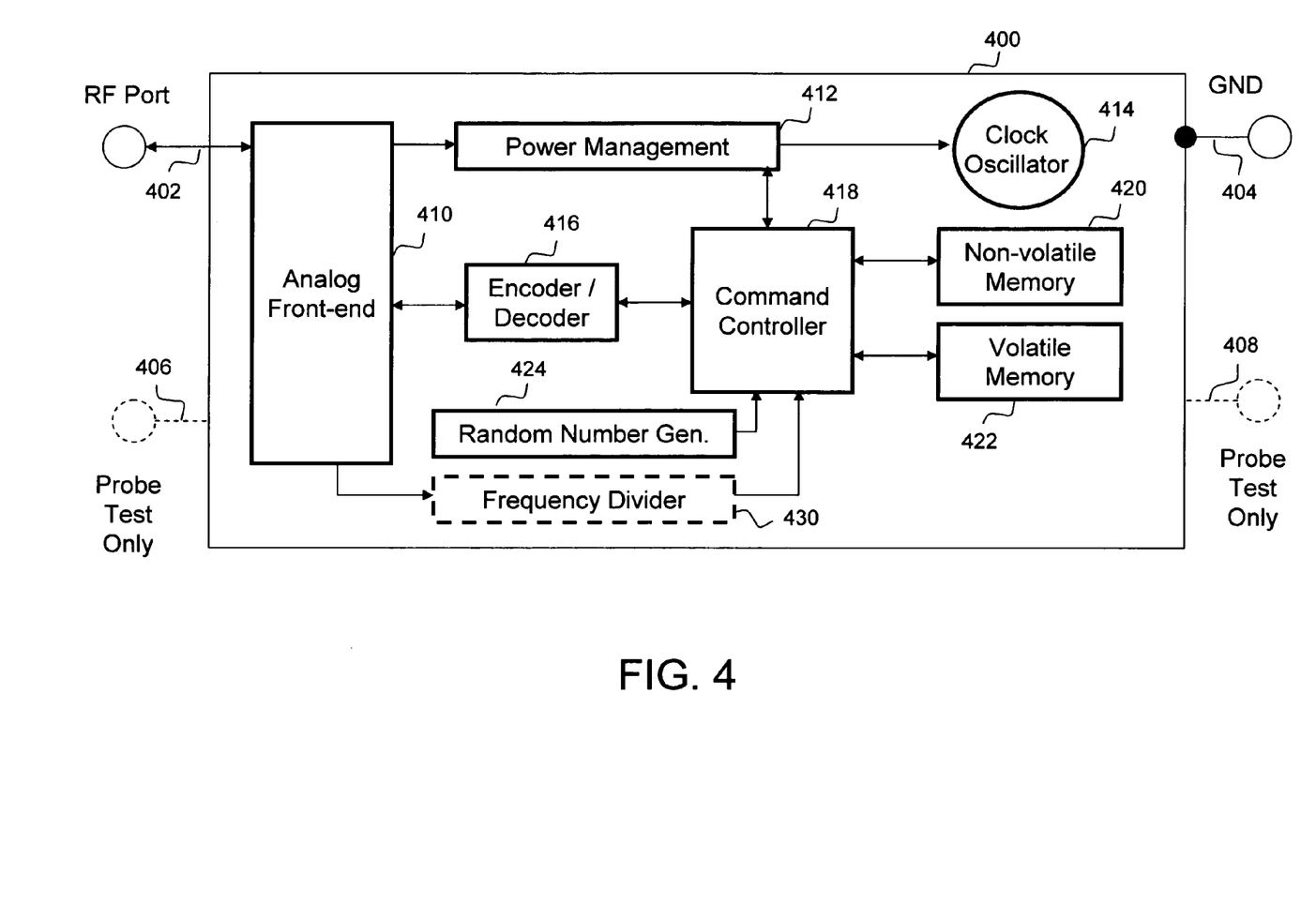
FIG. 4 is a block diagram of a RFID transponder of the present invention.

Turning now to FIG. 4, there is a block diagram of an RFID transponder 400 of the present invention. The RFID transponder is a microprocessor with an analog front end 410. The microprocessor includes power management block 412. The power management block 412 rectifies the CW signal to power the microprocessor and drives clock oscillator circuit 414 to time various circuit operations. The power management block typically requires 3-4 ms to achieve power up. A frequency divider circuit 430 divides down a received UHF CW signal for synchronous operation of command controller 418. Encoder/decoder circuit 416 encodes and decodes messages between command controller 418 and an external interrogator. The command controller 418 stores commands, an electronic product code, and passwords in non-volatile memory 420 and uses volatile memory 422 as a work space memory. The non-volatile memory may include other information for other applications such as those discussed with regard to FIGS. 1A-1C. Random number generator 424 generates a unique random number for the command controller 418 at each power up event to distinguish it from other RFID transponders having the same electronic product code. This is preferably a 32-bit random number from two concatenated 16-bit random numbers.

The RFID transponder 400 includes external probe test ports 406 and 408 as well as external RF port 402 and ground (GND) terminal 404. In operation, ports 406 and 408 and GND 404 are preferably used to initially program the non-volatile memory 420 of the RFID transponder for a particular application. These probe test ports 406, 408 are preferably only available prior to encapsulation of the RFID transponder. Alternatively, the non-volatile memory 420 of the RFID transponder may be field programmed for a particular application by control commands received via the RF port 402 and GND 404. In operation, the RFID transponder receives modulated interrogator CW signals at an antenna connected between RF port 402 and GND 404 as will be discussed in detail. In the following discussion it should be understood that such an antenna is part of a resonant circuit may be a simple dipole, an inductor, or a combination of the two. The antenna may be integrated in the RFID transponder analog front end 410, fabricated in the transponder encapsulation material, or otherwise externally connected between RF port 402 and GND 404. A capacitor forms another part of the resonant circuit for the RFID transponder. As with the antenna, the capacitor may be integrated in the RFID transponder analog front end 410, fabricated in the transponder encapsulation material, or otherwise externally connected between RF port 402 and GND 404.

Figure 5A:
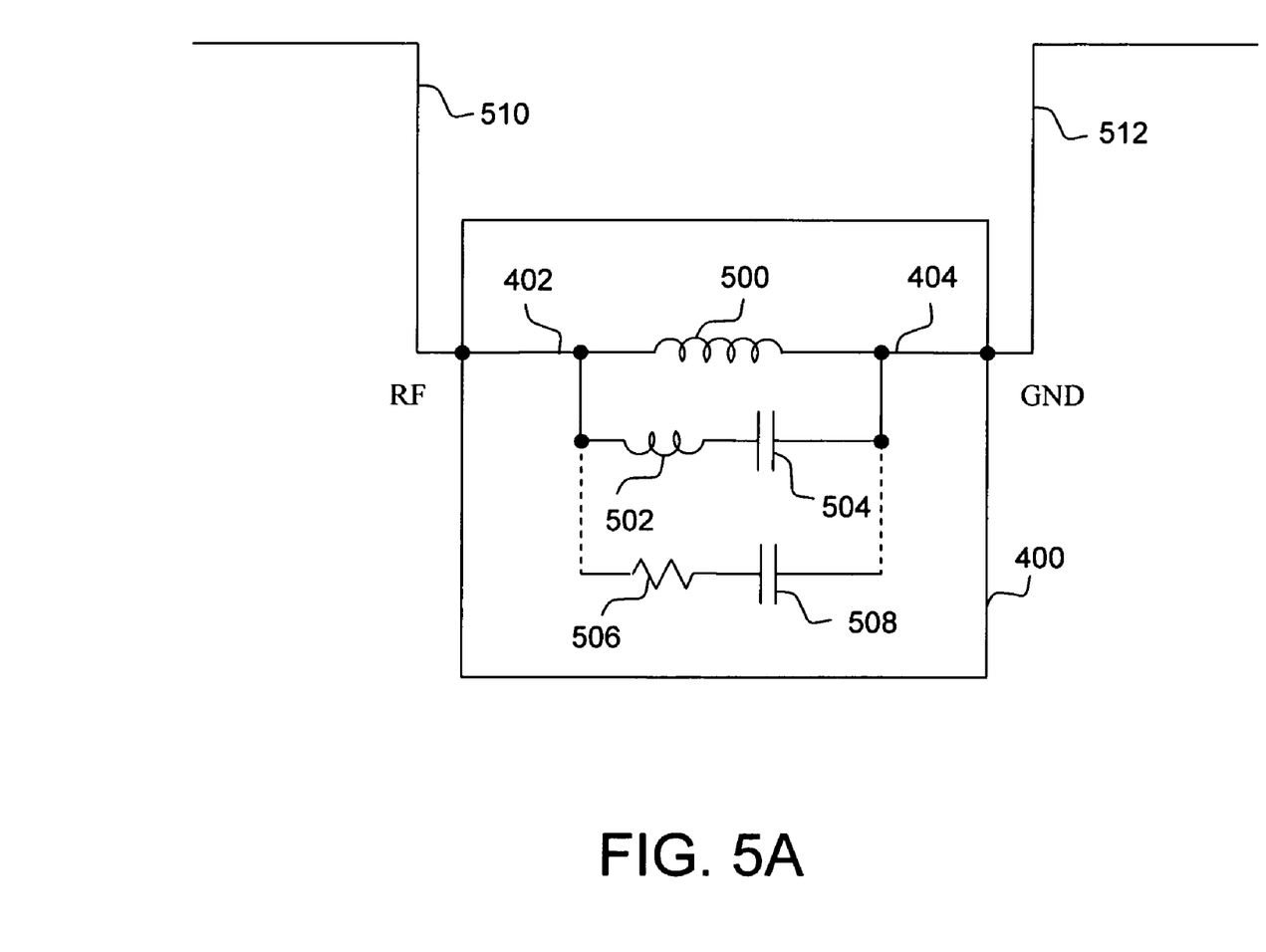
FIG. 5A is a diagram of an embodiment of a two terminal dual frequency (HF/UHF) resonant circuit of the present invention.

FIG. 5A is a diagram of an embodiment of a two terminal dual frequency (HF/UHF) resonant circuit that may be used for the RFID transponder 400 of FIG. 4 of the present invention. Each resonant frequency $f_o$ of the resonant circuit is a reciprocal of $2\pi\sqrt{LC}$. The resonant circuit includes a dipole 510, 512 connected to inductor 500 and across RF port 402 and GND 404. The resonant circuit also includes series connected inductor 502 and capacitor 504 connected across RF port 402 and GND 404. A dashed line is used to indicate series connected parasitic resistor 506 and input capacitance 508, having values of preferably 380 Ω and 2.8 pF, respectively.

Figure 5B:
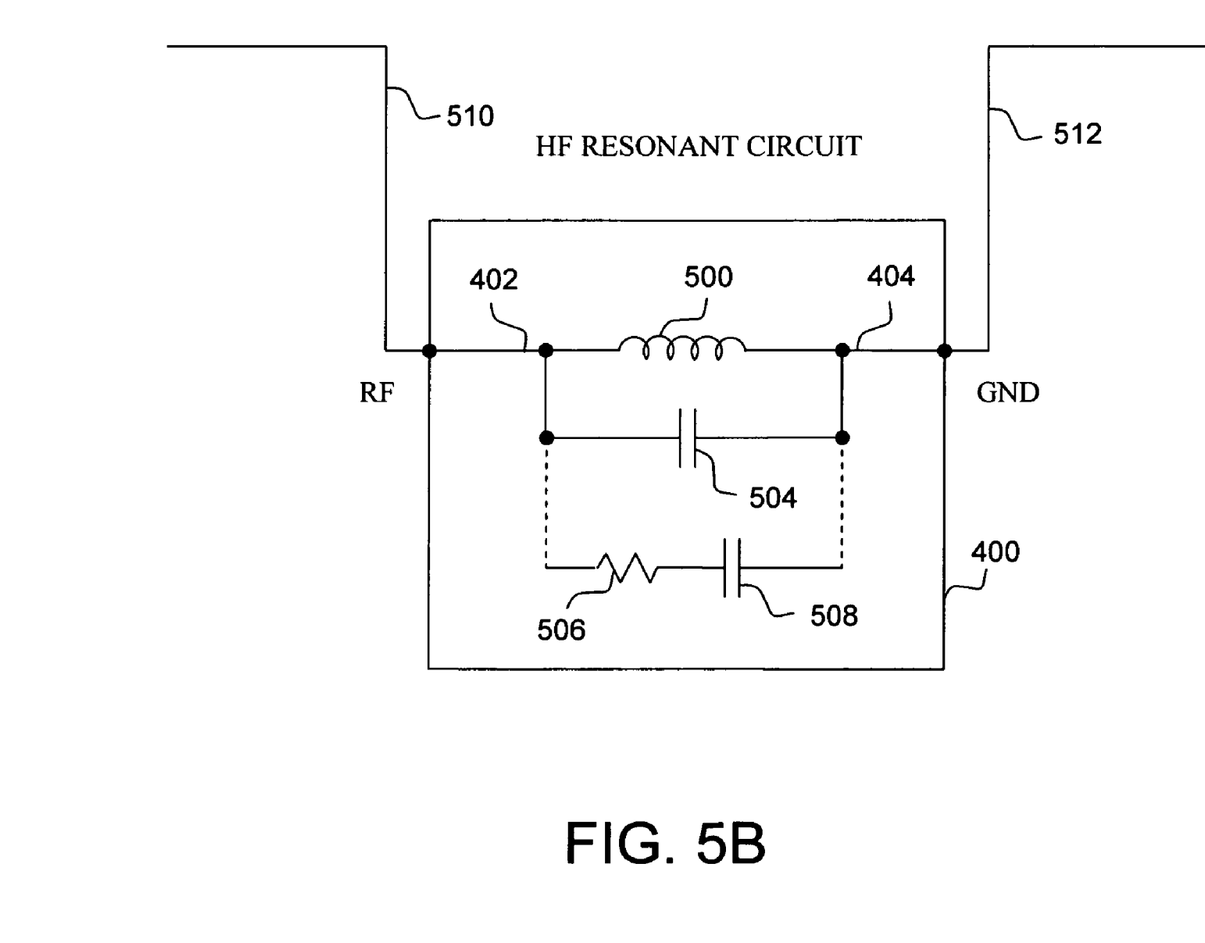
FIG. 5B is a diagram of the high frequency (HF) part of the embodiment of FIG. 5A.

FIG. 5B is a diagram of the high frequency (HF) resonant part of the embodiment of FIG. 5A. The value of inductor 502 (FIG. 5A) is negligible at high frequency and is, therefore, omitted from the HF resonant circuit. The combined inductance of dipole 510, 512 and inductor 500 is preferably 16 μH. Capacitor 508 is preferably 2.8 pF, and capacitor 504 is preferably 5.88 pF. The combined capacitance, therefore, is 8.68 pF. This yields a resonant high frequency of approximately 13.5 MHz.

Figure 5C:
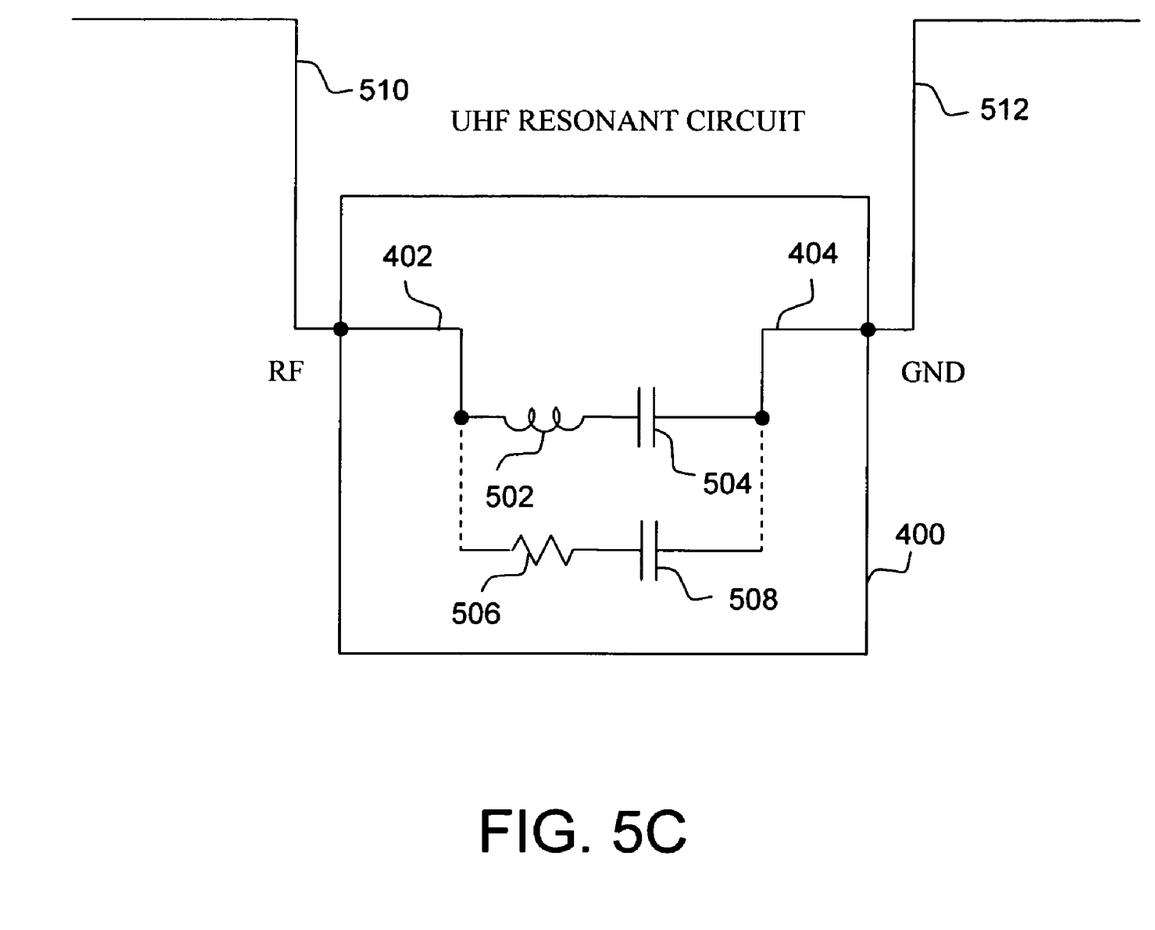
FIG. 5C is a diagram of the ultra high frequency (UHF) part of the embodiment of FIG. 5A.

FIG. 5C is a diagram of the ultra high frequency (UHF) resonant part of the embodiment of FIG. 5A. The value of inductor 500 (FIG. 5A) is 16 μH. At UHF it is approximately an open circuit and is, therefore omitted. The combined inductance of dipole 510, 512 and inductor 502 is preferably 15.89 nH. The combined capacitance in parallel with inductor 502 is the series combination of capacitors 504 and 508. This value is approximately 1.9 pF. This yields a resonant ultra high frequency of approximately 916 MHz. The peak voltage between RF port 402 and GND 404 is approximately 70% of the peak voltage across inductor 502 due to the voltage division of series connected capacitors 504 and 508. This reduced peak voltage, however, is adequate for operation of the RFID transponder 400.

Figure 6A:
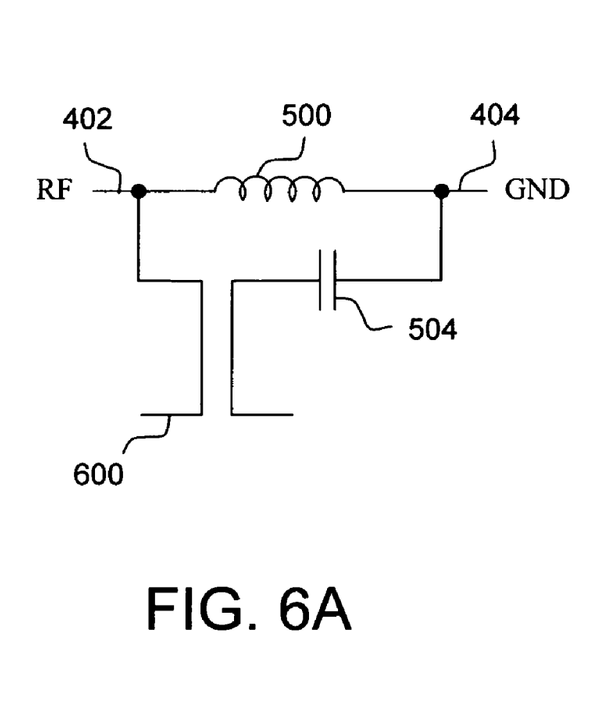
FIGS. 6A-6B are circuit diagrams of alternative embodiments of resonant circuits that may be used by the present invention.
Figure 6B:
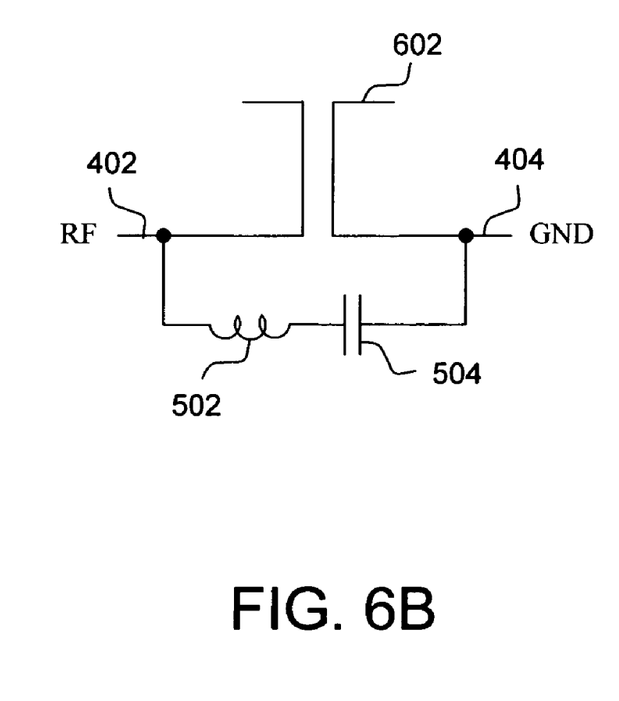

FIGS. 6A-6B are circuit diagrams of alternative embodiments of resonant circuits that may be used by the present invention. Reference numerals of previously discussed embodiments denote the same components in the present embodiment. The resonant circuit of FIG. 6A is similar to FIG. 5A except that inductor 502 is replaced by dipole 600 in the UHF resonant circuit. Likewise, FIG. 6B is similar to FIG. 5A except that inductor 500 is replaced by dipole 602 in the HF resonant circuit. An inductor, dipole, or other antenna configuration having appropriate inductance values, as known by those of ordinary skill in the art, may be used in various embodiments of the present invention. Moreover, these components may be fabricated as part of RFID transponder 400 (FIG. 4), combined in an encapsulating material of RFID transponder 400, or included in the packaging material or item to which RFID transponder 400 is attached. The present invention, therefore, offers significant advantages over single frequency RFID transponders of the prior art. According to embodiments of the present invention, a single RFID transponder is responsive to both UHF and HF interrogators. The dual frequency RFID transponder, therefore, is compatible with existing interrogators at entry points as well as point of sale terminals of typical retail outlets. Long range UHF transponders advantageously respond to UHF interrogators at entry points within several meters. Short range HF transponders advantageously respond to HF interrogators at point of sale terminals within several centimeters without creating interference at nearby point of sale terminals. Finally, if signal quality is impaired at one of the UHF/HF frequency bands, the other of the UHF/HF frequency bands may provide the required information.

Figure 7:
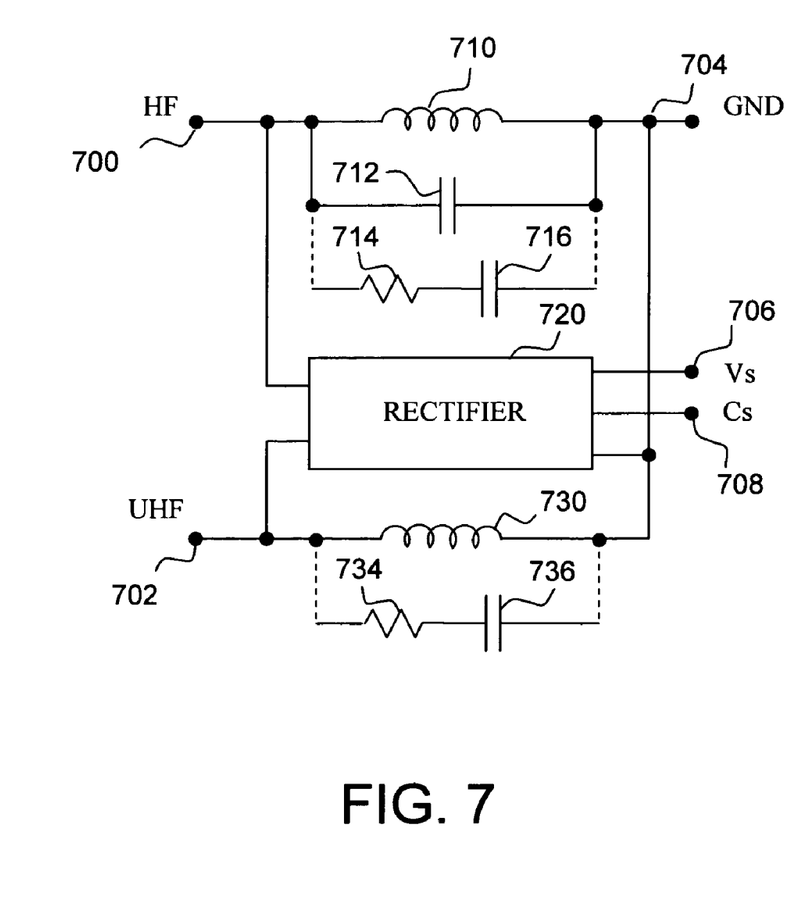
FIG. 7 is an embodiment of a three terminal dual frequency (HF/UHF) resonant circuit of the present invention.

Recall from the discussion of FIG. 5C that the peak voltage across RF port 402 and GND 404 was approximately 70% of the UHF resonant circuit peak voltage due to voltage division. FIG. 7 is an embodiment of a three terminal dual frequency (HF/UHF) resonant circuit of the present invention that avoids the voltage division and consequent reduced peak voltage. The HF resonant circuit is connected between HF port 700 and GND 704. It includes inductor 710, capacitors 712 and 716, and resistor 714. As previously discussed, resistor 714 and input capacitance 716 are parasitic elements having values of preferably 380 Ω and 2.8 pF, respectively. Inductor 710 has a value of preferably 16 μH. Capacitor 712 has a value of preferably 5.88 pF. Together they produce a resonant frequency of approximately 13.5 MHz. The UHF resonant circuit is formed separately between UHF port 702 and GND 704. It includes inductor 730, capacitor 736, and resistor 734. Resistor 734 and input capacitance 736 are parasitic elements having values of preferably 380 Ω and 2.8 pF, respectively. Inductor 730 has a value of preferably 10.9 nH. Together they produce a resonant frequency of approximately 910 MHz. The peak voltage for UHF or HF interrogator signals is applied to rectifier 720 of power management circuit 412 (FIG. 4). Rectifier 720 produces DC supply voltage Vs at terminal 706 as well as control signal Cs at terminal 708. Control signal Cs indicates whether the interrogator is UHF or HF by a difference in peak voltage between HF 700 and UHF 702 input ports.

Figure 8:
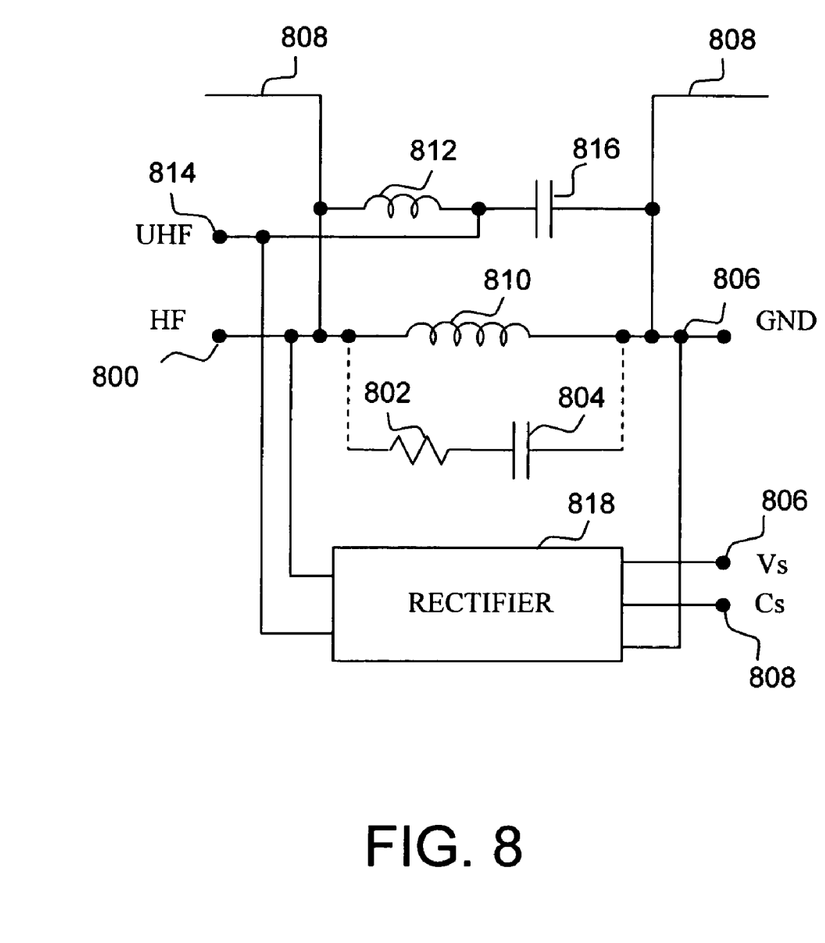
FIG. 8 is an alternative embodiment of a three terminal dual frequency (HF/UHF) resonant circuit of the present invention.

FIG. 8 is an alternative embodiment of a three terminal dual frequency (HF/UHF) resonant circuit of the present invention. The resonant circuit is formed between HF port 800, UHF port 814, and GND 806. The HF resonant part of the circuit includes dipole 808, inductor 810, capacitors 804 and 816, and resistor 802. The value of inductor 812 is negligible at high frequency and is, therefore, omitted from the HF resonant circuit. Resistor 802 and input capacitance 808 are parasitic elements having values of preferably 380 Ω and 2.8 pF, respectively. Capacitor 816 is preferably 5.88 pF for a total parallel capacitance of 8.68 pF. The combined inductance of dipole 808 and inductor 810 is preferably 16 μH. This yields a resonant HF frequency of approximately 13.5 MHz. The UHF resonant part of the circuit is formed between UHF port 814 and GND 806. It includes dipole 808, inductor 812, series connected capacitors 804 and 816, and resistor 802. Inductor 810 is approximately an open circuit at UHF and is, therefore, excluded. The combined inductance of dipole 808 and inductor 812 is preferably 15.89 nH. The series combination of capacitors 816 and 804 is approximately 1.9 pF. This yields a resonant UHF frequency of approximately 916 MHz. The UHF or HF interrogator signals are applied to rectifier 818 of power management circuit 412 (FIG. 4). Rectifier 818 produces DC supply voltage Vs at terminal 806 as well as control signal Cs at terminal 808. Control signal Cs indicates whether the interrogator is UHF or HF by a difference in peak voltage between HF 800 and UHF 814 input ports. The three terminal resonant circuit of FIG. 8 advantageously avoids the degraded peak voltage of the UHF resonant circuit.

Still further, while numerous examples have thus been provided, one skilled in the art should recognize that various modifications, substitutions, or alterations may be made to the described embodiments while still falling with the inventive scope as defined by the following claims. For example, embodiments of the present invention may be applied to virtually any item where accountability is desired. Cost and size of the RFID transponders make them suitable for small items such as poker chips, DVDs, and electronic items. Other combinations will be readily apparent to one of ordinary skill in the art having access to the instant specification.

What is claimed is:

1. A radio frequency identification transponder, comprising:
    a first terminal;
    a second terminal;
    a first resonant circuit having a first resonant frequency and connected between the first and second terminals; and a second resonant circuit having a second resonant frequency different from the first resonant frequency and connected between the first and second terminals.

2. A transponder as in claim 1, wherein the first resonant frequency is a high frequency, and wherein the second resonant frequency is an ultra high frequency.

3. A transponder as in claim 1, wherein the first resonant circuit comprises:
   a first inductor connected between the first terminal and the second terminal; and
   a first capacitor connected in parallel with the first inductor.

4. A transponder as in claim 3, wherein the second resonant circuit comprises:
   a second inductor; and
   a second capacitor connected in series with the second inductor, wherein the second inductor and the second capacitor are connected between the first and second terminals.

5. A transponder as in claim 3, wherein the first inductor comprises a dipole.

6. A transponder as in claim 3, wherein the first resonant circuit comprises a dipole connected in parallel with the first inductor.

7. A transponder as in claim 4, wherein the second inductor comprises a dipole.

8. A transponder as in claim 4, wherein the second resonant circuit comprises a dipole connected in parallel with the second inductor.

9. A transponder as in claim 1, comprising a rectifier circuit connected between the first and second terminals.

10. A transponder as in claim 1, comprising a processor connected to the first and second terminals.

11. A radio frequency identification transponder, comprising:
   a first terminal;
   a second terminal;
   a third terminal;
   a processor connected to the first, second, and third terminals;
   a first resonant circuit having a first resonant frequency and connected between the first and third terminals; and
   a second resonant circuit having a second resonant frequency different from the first resonant frequency and connected between the second and third terminals.

12. A transponder as in claim 11, wherein the first resonant frequency is a high frequency, and wherein the second resonant frequency is an ultra high frequency.

13. A transponder as in claim 11, wherein the first resonant circuit comprises:
   a first inductor connected between the first terminal and the third terminal; and
   a first capacitor connected in parallel with the first inductor.

14. A transponder as in claim 13, wherein the second resonant circuit comprises:
   a second inductor connected between the second terminal and the third terminal; and
   a second capacitor connected in parallel with the second inductor.

15. A transponder as in claim 13, wherein the first resonant circuit comprises a dipole connected in parallel with the first inductor.

16. A transponder as in claim 14, wherein the second resonant circuit comprises a dipole connected in parallel with the second inductor.

17. A transponder as in claim 11, comprising a rectifier circuit connected between the first, second, and third terminals.

* * * * *